United States Patent

Riese

[11] Patent Number: 5,096,149
[45] Date of Patent: Mar. 17, 1992

[54] TWIST TYPE MOUNTING DEVICE

[76] Inventor: Irving L. Riese, 57 Noble St., Newton, Mass. 02165

[21] Appl. No.: 663,261

[22] Filed: Mar. 1, 1991

[51] Int. Cl.$^5$ .............................................. A47B 96/06
[52] U.S. Cl. ................................. 248/216.1; 248/493
[58] Field of Search ............... 248/216.1, 218.1, 218.2, 248/493, 497, 498, 546; 81/3.45, 3.48; 24/710.4, 711.3; 411/392

[56] References Cited

U.S. PATENT DOCUMENTS

| 168,113 | 9/1875 | Smith | 248/497 |
| 406,255 | 7/1889 | Brinkerhoff | 248/493 |
| 2,192,643 | 3/1940 | Kennedy | 81/3.45 X |
| 3,330,012 | 7/1967 | Hart | 24/711.3 |
| 4,026,510 | 5/1977 | Holmes | 248/216.1 X |
| 4,378,926 | 4/1983 | Hodack | 248/216.1 X |
| 4,917,554 | 4/1990 | Brown | 411/392 |

FOREIGN PATENT DOCUMENTS 143821  1/1954  Sweden ........................... 248/216.1

OTHER PUBLICATIONS

Enclosure A Common Push Pin, Enclosure B Twist Pin Mfg. by Dritz Co.

Primary Examiner—J. Franklin Foss

[57] ABSTRACT

A twist-type mounting deviced comprising a stem handle which has one or more protruding ridges encircling the stem and an elongated, corkscrew-shaped pointed pin axially extending from the center of one end of the stem handle. One or more of the protruding ridges may be crenelated or reeded to facilitate finger twisting.

4 Claims, 6 Drawing Sheets

TWIST TYPE MOUNTING DEVICE

BACKGROUND

1. Field of Invention

This invention relates to a mounting device which, when installed manually with pressure into a soft penetrable surface such as the cloth facing of an office partition will serve to mount, support, and display for ready reference various office accessories such as clipboards, data sheets, work schedules, calendars, and other such commonly used items either by piercing said office accessories to attach to cloth directly or by attaching the mounting device to the cloth surface and then suspending the accessory from said mounting device by means of spring clips, hooks, or other suspending means.

This invention relates to the subject of my disclosure statement #222167 and #222180 dated Mar. 14, 1989.

2. Description of Prior Art

In order to maximize office space many offices are designed utilizing cloth faced portable partitions. These offices are usually rather small and allow enough space for only a small desk and file cabinet. People occupying these offices find a great need to have various items of reference close at hand. The cloth walls of these partitions could furnish excellent means for displaying whatever is needed for ready reference. Unfortunately, there is no all-purpose mounting device made today that can be utilized for the aforementioned purpose. The ordinary thumbtack or push pin does not serve the purpose because neither one will remain attached to the cloth and instead will fall out when any object is suspended from it or fastened to the cloth by it.

Another type of fastener available is the twist pin which is used in the upholstery trade to attach doilies to the armrests of upholstered chairs. However, like the thumbtack, this pin has a flat head which is too narrow to accomodate a suspended object.

Another available device is a bar suspended from a pressure clip which grips the top frame of the partition. Hooks can be attached to the suspended bar, but these are used for coat hangers rather than for reference items.

Another available device is a bar to which is attached a cork board. The vertical height of the bar can be adjusted by fasteners at each end attached to the vertical frame of the partition. Thumbtacks or push pins can then be used, utilizing the cork board as a supporting wall for the tacks. This item involves a much greater expense than my invention and may be quite awkward to adjust or to move when necessary since everything attached to it would be moved at the same time, or all attached objects would first have to be removed before moving it to a different location.

Most office personnel, then, would find it much more desirable and economical to have an inexpensive, simple mounting device which could be kept at hand in adequate quantities and distributed as desired to all personnel to mount reference materials.

OBJECTS AND ADVANTAGES

Accordingly I claim the following as my objects and advantages of the invention: to provide a convenient, inexpensive mounting device by which various papers, printed items, calendars, data sheets, work schedules, and other items usually posted in office areas can be firmly mounted to cloth-faced office partitions or other soft penetrable surfaces for ready reference. In addition I claim the following additional objects and advantages: to provide a mounting device from which various office accessories such as clip boards, spring clips, and containers to hold such items as paper clips, keys, eyeglasses, and other items can be hung for convenient use.

The objectives and features of the invention will become more readily apparent from the following detailed descriptions and the accompanying drawings.

DRAWING FIGURES

FIG. 1 shows a mounting device that is the preferred embodiment of the invention.

FIGS. 2, 3, and 4 show other embodiments which can be used for the same mounting device.

DRAWING REFERENCE NUMERALS

Figure 1:
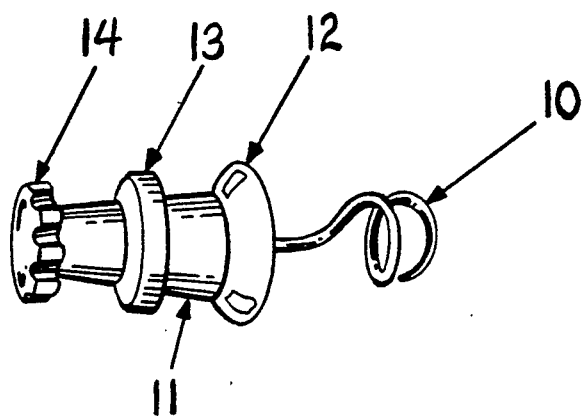

10 Holding element
11 Stem handle
12 Enlarged skirt ridge
13 Enlarged ridge in center of stem handle
14 Crenelated ridge
15 Enlarged ridge not crenelated
16 Soft soundproofing layer
17 Cloth side of partition
18 Hard board or metal backing of partition
19 Spring clip
20 Enlarged ridge on quadrilateral embodiment
21 Enlarged skirt ridge on quadrilateral embodiment

DESCRIPTION OF MOUNTING DEVICE

FIG. 1 shows the mounting device according to the preferred embodiment of the invention. The Device comprises a stem (11) to which an elongated corkscrew-shaped pointed pin (10) is permanently attached. Said mounting device when twisted by fingers and accompanied simultaneously by manual pressure directed into the cloth panel (17) will penetrate into the soft soundproofing layer (16) and attach itself firmly to the panel. The end of the stem (11) furthest from the pin holding element (10) has a protruding crenelated ridge (14) encircling the entire circumference to facilitate the twisting motion. An additional ridge (13) is located between the two ridges (12 and 14). The crenelated ridge (14) and the center ridge (13) distinguish this type fastener and differentiate this fastener from the ordinary familiar twist pin or push pin.

Figure 2:
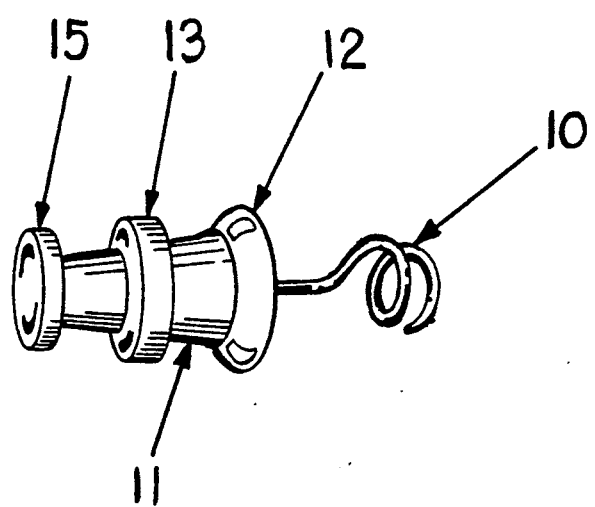
Figure 3:
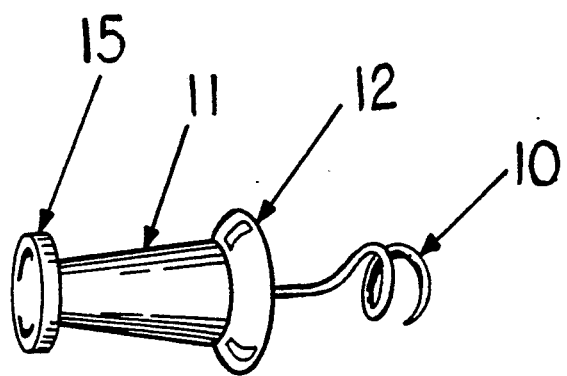
Figure 4:
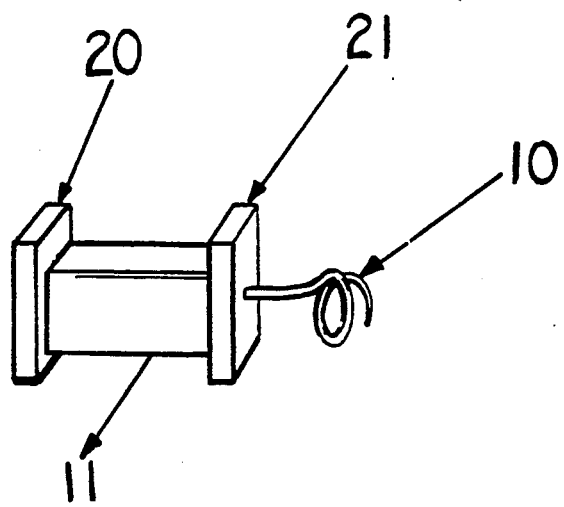

FIGS. 2, 3, and 4 are other shapes which may be used for the same type mounting device.

FIG. 2 shows a device in which both flange-like ridges 13 and 15 are smooth.

FIG. 3 shows the device without a middle ridge 13; it has only the ridge 12 and the ridge 15.

FIG. 4 shows the device having a quadrilateral cross-section.

Figure 5:
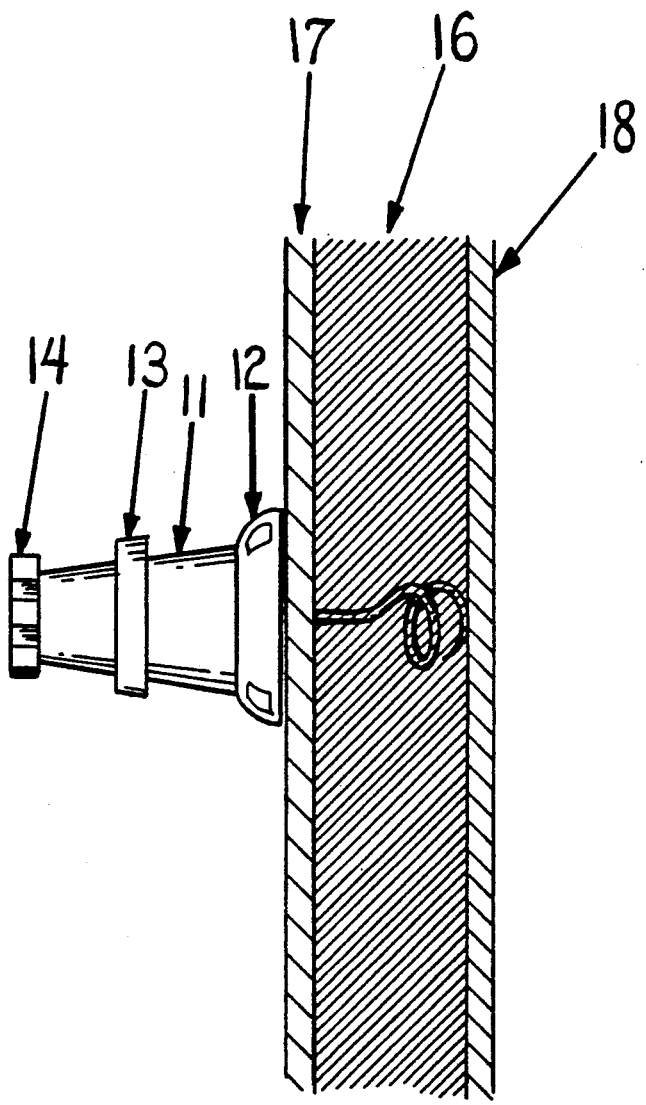
FIG. 5 shows a cross-sectional view indicating how the fastener is attached to the cloth side.

FIG. 5 shows in cross-section how the mounting device of FIG. 1 is attached to the cloth surface 17 of the partition which consists of a cloth face 17, a soft center layer 16, and a hard board or metal backing 18.

Figure 6:
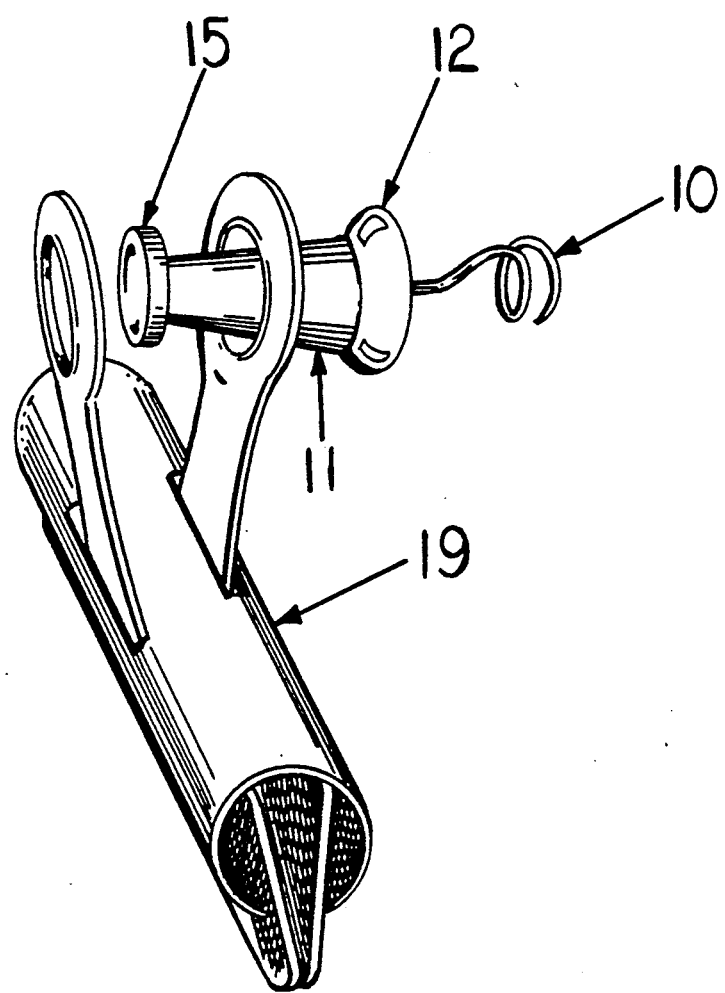
FIG. 6 shows how the fastener is utilized to hang a spring clip.

FIG. 6 shows a spring clip 19 suspended from the stem 11 of the mounting device of FIG. 3.

Note that the mounting device as illustrated has a section of the stem 11 between the ridges 15 and 13, and between the skirt ridge 12 and the ridges 15 or 13.

The invention thus provides a twist-type mounting device that can be installed on a soft penetrable panel with a manual twist and push. The mounting device can be removed again without damage to the soft panel with a reverse twist and pull.

While the above description contains several specificities they are not to be construed as limitations on the scope of the invention but merely as exemplifications of preferred embodiments thereof. Those skilled in the art will envision many other possible variations within its scope. For example, skilled artisans will readily be able to change the dimensions and shapes of the various embodiments. They will also be able to make the mounting device of materials such as plastic, wood, or metal. Accordingly, the scope of the invention is determined by the appended claims and their legal equivalents and not by the examples which have been given.

I claim:

1. A twist type mounting device for anchoring an article to or suspending an article from a resilient or soft material comprising:
   a stem handle means to support or suspend a mounted item and
   an elongated helical or corkscrew shaped wire or plastic pin sharply pointed at one end, anchored to the said stem at its other end and extending axially from stem handle means; and wherein said stem handle means has one or more flange-like protruding ridges completely encircling said stem handle means to prevent a suspended item from falling from said stem handle means.

2. The device of claim 1 wherein one or more encircling ridges are crenelated to facilitate finger twisting.

3. The device of claim 1 wherein one or more encircling ridges are reeded to facilitate finger twisting.

4. The device of claim 1 wherein said stem handle means has a quadrilateral configuration instead of being cylindrical in shape.

* * * * *